(12) United States Patent
Gembala

(10) Patent No.: US 7,766,537 B2
(45) Date of Patent: Aug. 3, 2010

(54) LIGHTWEIGHT FOAMED CONCRETE MIXER

(76) Inventor: Henry Gembala, 1431 SW. 30th Ave., Deerfield Beach, FL (US) 33442

( * ) Notice: Subject to any disclaimer, the term of this patent is extended or adjusted under 35 U.S.C. 154(b) by 0 days.

(21) Appl. No.: 12/657,396

(22) Filed: Jan. 19, 2010

(65) Prior Publication Data

US 2010/0127476 A1  May 27, 2010

Related U.S. Application Data

(63) Continuation-in-part of application No. 11/062,148, filed on Feb. 18, 2005, now abandoned.

(51) Int. Cl.
*B28C 7/04* (2006.01)
(52) U.S. Cl. ............... 366/10; 366/16; 366/18; 366/20; 261/DIG. 26
(58) Field of Classification Search ............ 366/10, 366/11, 13, 16, 51, 152.1, 160.1–160.5; 169/13–15; 261/DIG. 26, 94
See application file for complete search history.

(56) References Cited

U.S. PATENT DOCUMENTS

| | | | | |
|---|---|---|---|---|
| 3,522,069 A | * | 7/1970 | Checko et al. | 427/372.2 |
| 3,811,660 A | * | 5/1974 | Cole, Jr. | 261/18.1 |
| 4,213,936 A | * | 7/1980 | Lodrick | 422/133 |
| 4,298,288 A | * | 11/1981 | Weisbrod | 366/8 |
| 4,310,996 A | * | 1/1982 | Mulvey et al. | 52/794.1 |
| 4,394,289 A | * | 7/1983 | Brown et al. | 366/101 |
| 4,922,463 A | * | 5/1990 | Del Zotto et al. | 366/21 |
| 5,044,819 A | * | 9/1991 | Kilheffer et al. | 404/72 |
| 5,102,228 A | * | 4/1992 | Vine-Lott | 366/3 |
| 5,113,945 A | * | 5/1992 | Cable | 169/15 |
| 5,141,363 A | * | 8/1992 | Stephens | 405/150.1 |
| 5,145,014 A | * | 9/1992 | Eberhardt | 169/14 |
| 5,232,052 A | * | 8/1993 | Arvidson et al. | 169/14 |
| 5,255,747 A | * | 10/1993 | Teske et al. | 169/15 |
| 5,411,100 A | * | 5/1995 | Laskaris et al. | 169/14 |
| 5,419,632 A | * | 5/1995 | Stephens | 366/3 |
| 5,494,112 A | * | 2/1996 | Arvidson et al. | 169/13 |
| RE35,362 E | * | 10/1996 | Arvidson et al. | 169/13 |

(Continued)

FOREIGN PATENT DOCUMENTS

EP   77652 A1 * 4/1983

(Continued)

*Primary Examiner*—Charles E Cooley
(74) *Attorney, Agent, or Firm*—Robert M. Downey, P.A.

(57) ABSTRACT

An apparatus for on-site manufacturing of lightweight concrete used for insulation in roof decks and roof systems of building structures. The apparatus is supported on a transportable trailer frame and includes a mixer, a concrete pump, and one or more tanks for holding a mixture of water and chemical products, such as foaming agents. The chemical agents/water solution is mixed with pressurized air according to a desired foam density and volume and is pumped through a foam cylinder ejector. The air/solution mixture exiting the ejector is directed into a carburetor which generates a foam product by mechanical impact of the air/solution mixture with beads contained in the carburetor. Concrete and the foam product are combined in the mixer, in accordance with a predetermined mixture ratio, and released into the concrete pump for forced discharge from the apparatus and application to a roof structure. A programmable logic controller controls the discharge rate and the amount of cement and foam product needed per batch according to the desired mixture ratio.

2 Claims, 3 Drawing Sheets

U.S. PATENT DOCUMENTS

| | | | |
|---|---|---|---|
| 5,582,776 A * | 12/1996 | Crawley et al. | 261/18.1 |
| 5,590,976 A * | 1/1997 | Kilheffer et al. | 404/72 |
| 5,795,060 A * | 8/1998 | Stephens | 366/2 |
| 5,803,596 A * | 9/1998 | Stephens | 366/10 |
| RE36,196 E * | 4/1999 | Eberhardt | 169/14 |
| 6,009,953 A * | 1/2000 | Laskaris et al. | 169/13 |
| 6,354,726 B2 * | 3/2002 | Foerster | 366/3 |
| 6,733,004 B2 * | 5/2004 | Crawley | 261/18.1 |
| 6,766,863 B2 * | 7/2004 | Arvidson et al. | 169/14 |
| 6,991,041 B2 * | 1/2006 | Laskaris et al. | 169/14 |
| 7,614,455 B2 * | 11/2009 | Arvidson et al. | 169/15 |
| 2004/0055762 A1 * | 3/2004 | Arvidson et al. | 169/14 |
| 2004/0177975 A1 * | 9/2004 | Laskaris et al. | 169/13 |
| 2005/0155776 A1 * | 7/2005 | Arvidson et al. | 169/14 |
| 2005/0195681 A1 * | 9/2005 | Gembala | 366/46 |
| 2006/0013062 A1 * | 1/2006 | Gembala | 366/101 |

FOREIGN PATENT DOCUMENTS

| | | |
|---|---|---|
| EP | 286149 A1 * | 10/1988 |
| EP | 1103533 A2 * | 5/2001 |
| GB | 2093715 A * | 9/1982 |
| GB | 2202163 A1 * | 9/1988 |
| WO | 8202358 A1 * | 7/1982 |

* cited by examiner

LIGHTWEIGHT FOAMED CONCRETE MIXER

This application is a Continuation-In-Part of patent application Ser. No. 11/062,148 filed on Feb. 18, 2005,now abandoned.

BACKGROUND OF THE INVENTION

1. Field of the Invention

The present invention is directed to an apparatus for manufacturing lightweight concrete during the installation of roof decks of a building structure.

2. Discussion of the Related Art

Lightweight concrete is used extensively in the construction of buildings, and particularly in the installation of roof decks and related roof systems. When installing a roof deck on a building structure, lightweight concrete is disbursed, in a slurry coat, to form a topping layer of insulation over underlying roofing materials. Lightweight concrete typically consists of a combination of Portland cement, one or more foaming agents, water and possibly other chemical agents. To insure proper distribution of the lightweight concrete, prior to curing, it is important to discharge the lightweight concrete mixture on the roof deck shortly after the mixing process. Presently, the process for manufacturing lightweight concrete for on-site installation involves the use of one or more compressors, a pressurized tank for holding chemicals, a separate cement mixer, a concrete pump and an elaborate series of hoses for directing water, chemicals, cement, foaming agents and other chemicals to be mixed and discharged in rapid action. Using this method, the lightweight concrete is manufactured in batches and then discharged in a slurry coat on the roof deck. After each batch is exhausted, subsequent batches are manufactured and discharged until the installation of the lightweight concrete roof insulation is complete. The presently used method of on-site manufacturing of lightweight concrete presents several problems and concerns. Specifically, pressurized hoses have been known to burst, subjecting workers to potential serious injury. Additionally, the numerous equipment and hoses needed to mix the components of the lightweight concrete mixture often become tangled, which results in possible equipment malfunctions and operational delays. A further problem with the presently used mixing process is the inability to produce uniform and consistent mixtures of lightweight concrete which meet code requirements, such as consistency in pull strengths throughout the roof deck. Because the mixing process, and particularly the rate and amount of flow of each component in the mixture relies on human judgment, it is difficult, if not impossible, to produce uniform and consistent mixtures throughout multiple batches.

Accordingly, there is an urgent need in the construction industry for a contained and portable apparatus which is specifically structured for on-site manufacturing of lightweight concrete in a safe, controlled and highly predictable process to produce a continuous on demand supply of lightweight concrete in a consistent, uniform mixture.

SUMMARY OF THE INVENTION

The present invention is directed to an apparatus for on-site manufacturing of lightweight concrete used for insulation in roof decks and roof systems of building structures. The apparatus is supported on a transportable trailer frame and includes a mixer, a concrete pump, and one or more tanks for holding a mixture of water and chemical products, such as foaming agents. The chemical agents/water solution is mixed with pressurized air according to a desired foam density and volume and is pumped through a foam cylinder ejector. The air/solution mixture exiting the ejector is directed into a carburetor which generates a foam product by mechanical impact of the air/solution mixture with beads contained in the carburetor. Concrete and the foam product are combined in the mixer, in accordance with a predetermined mixture ratio, and released into the concrete pump for forced discharge from the apparatus and application to a roof structure. A programmable logic controller controls the discharge rate and the amount of cement and foam product needed per batch according to the desired mixture ratio.

BRIEF DESCRIPTION OF THE DRAWINGS

For a fuller understanding of the nature of the present invention, reference should be made to the following detailed description taken in conjunction with the accompanying drawings in which.

Like reference numerals refer to like parts throughout the several views of the drawings.

DETAILED DESCRIPTION OF THE PREFERRED EMBODIMENT

Figure 1:
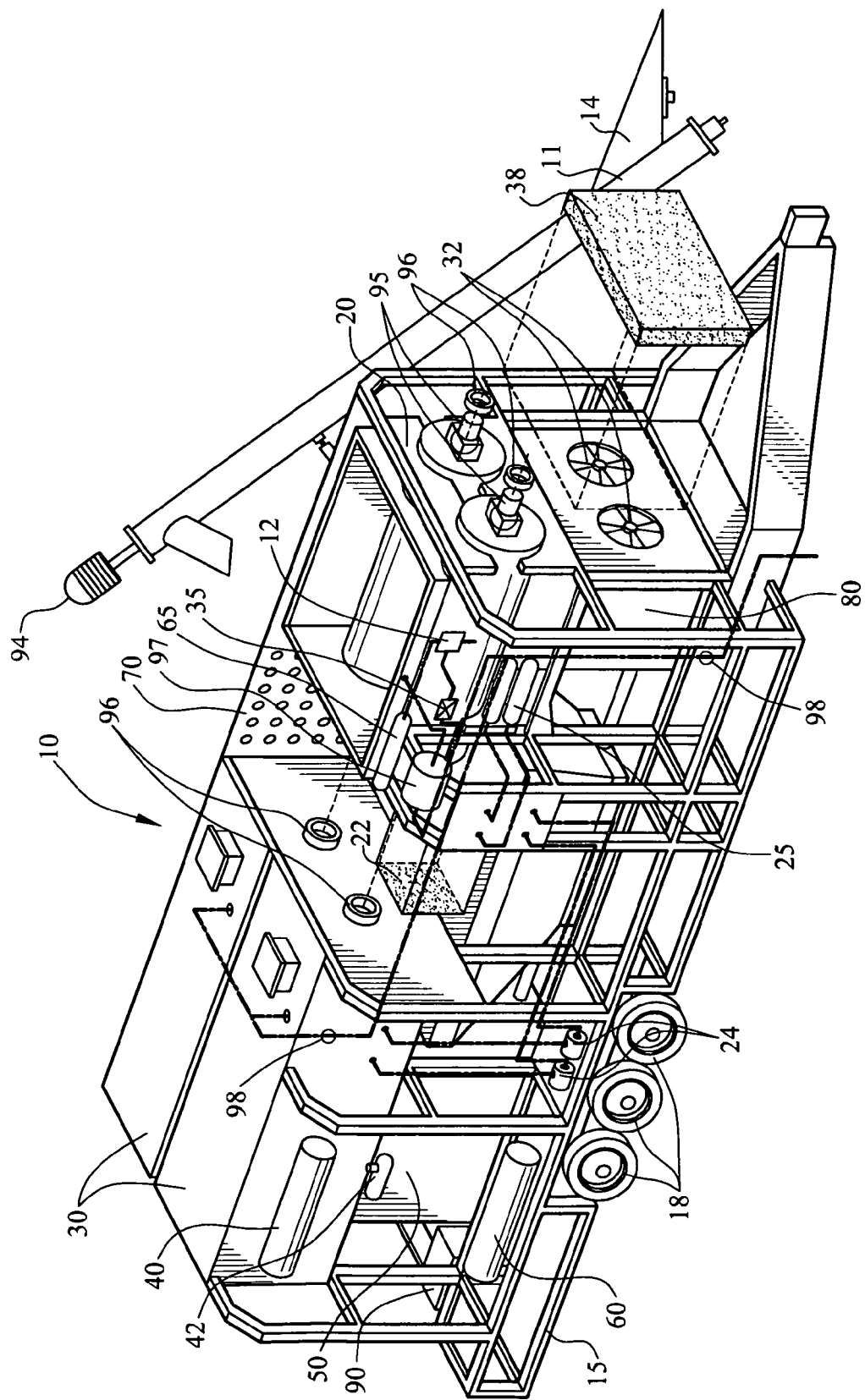
FIG. 1 is a front, top perspective view of the lightweight concrete manufacturing apparatus of the present invention, shown partially open to reveal the major components thereof.

Referring to the several views of the drawings, the lightweight concrete manufacturing apparatus of the present invention is shown and is generally indicated as 10. As seen, the apparatus 10 is preferably supported on a trailer or chassis frame structure 15 with multiple axles (e.g., triple axle suspension) and wheels 18 to support the weight of the apparatus 10. In this preferred embodiment, the apparatus 10 is intended to be towed by a vehicle, such as a truck.

The apparatus 10 includes a dual drum mixer 20 which is open on the top for receiving a loose flowing supply of concrete from a hopper 14 and up through a hydraulic auger that is operated by a hydraulic auger motor 94. The cement (concrete) in the hopper 14 is measured in a hydraulic cylinder connected to a pressure sensor that measures the PSI. The PSI is converted to pounds of weight by a PLC (programmable logic controller) 35. One or more tanks 30 are provided for containing chemical agents and water. In a preferred embodiment, two 200 gallon individually operated solution tanks hold one or more foaming agents (in liquid form) mixed with water to provide a solution that is used to make a foam product. The foam product is then used in the manufacture of lightweight concrete. In a preferred embodiment, the foaming agent is a concentrate known commercially as CONCRE-CEL™. Portland cement and the foam product are combined in mixer 20 in accordance with a predetermined mixture ratio.

A turbo diesel engine 50 drives operation of hydraulic motors which, in turn, drive several of the components of the apparatus. A fuel tank 90 holds a supply of fuel for operating the diesel engine 50. A control panel 70 is provided with controls and gauges for operating, regulating and monitoring operation of the several components throughout the mixture and discharge process, including a hydraulic system and the diesel engine 50. The hydraulic system used for controlling the operation of most of the components includes a hydraulic oil tank 80 for containing the hydraulic fluid of the system and a transmission for delivering hydraulic fluid to the motors which drive the mixer 20, concrete pump, air compressor and other components. In particular, the mixer has dual hydraulic reversible mixer motors 95 that turn mixing paddles in the mixer 20. The mixer motors have a self packing bearing system 96. The hydraulic oil in the hydraulic system is cooled by cooling fans 32 as the hydraulic oil travels through the cooling radiator 38. The hydraulic air compressor 60 has a filter 42 with a separate cooling system.

Figure 2:
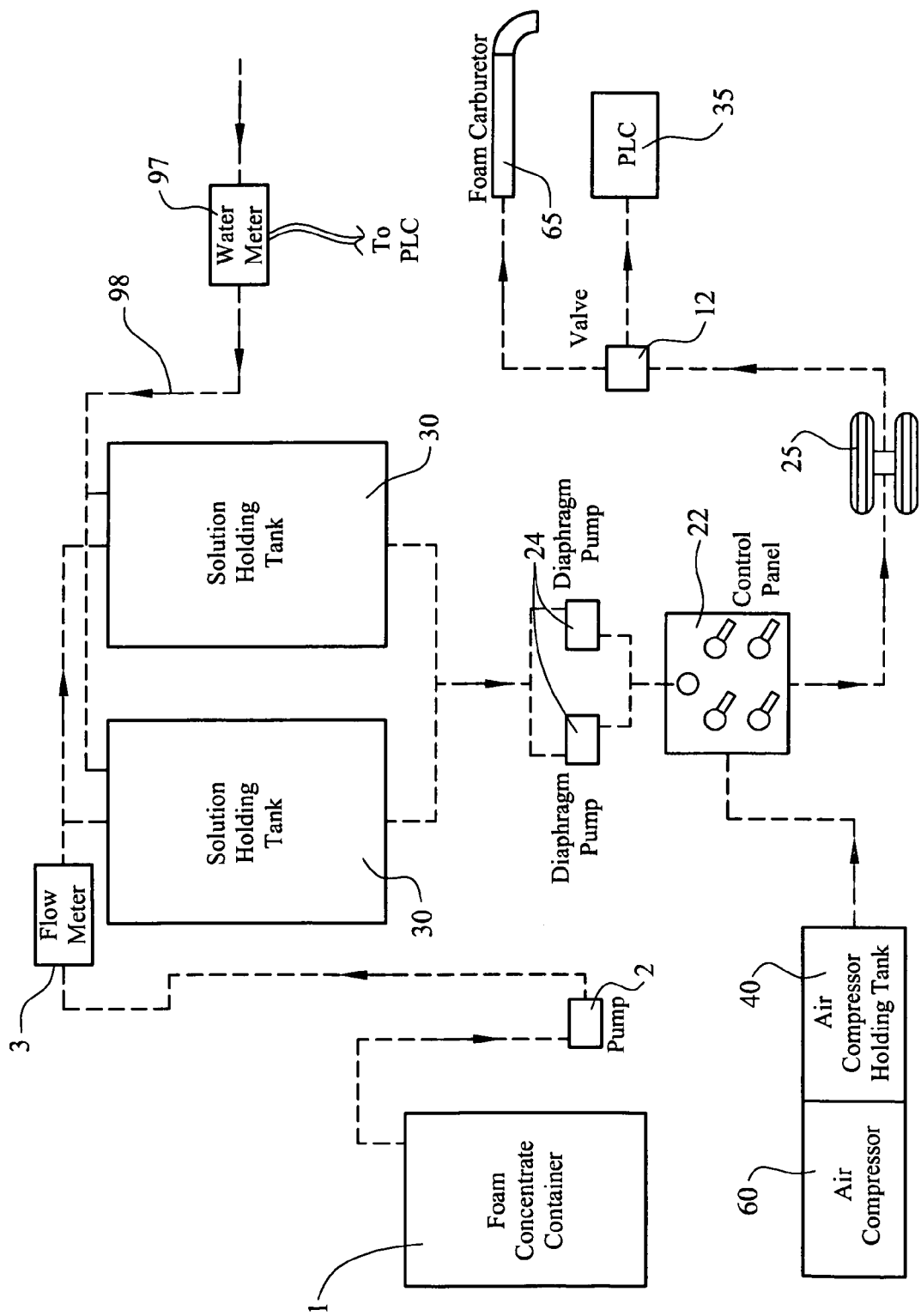
FIG. 2 is a schematic diagram illustrating the components and the operational flow of materials through a foam generating system of the apparatus of the present invention.

Referring now to FIG. 2, the foam generating system of the apparatus 10 is described in more detail. Initially, the foam generating solution is made by mixing the liquid foam concentrate with water according to a controlled mixture ratio. The foam concentrate is pumped from a container 1, such as a 55 gallon drum, to the two 200 gallon tanks 30 with use of a diaphragm pump 2. The pumped foam liquid concentrate is directed through a flow meter 3 that measures the rate of flow in order to obtain the proper solution mixture ratio of foam liquid concentrate and water that is filled into the 200 gallon tanks 30. A supply of water 98 is delivered from a water supply source and is directed through a water meter 97. More specifically, the amount of water is measured by an electronic magnetic drive water meter 97. The PLC (programmable logic controller) 35 communicates with the flow meter 3 and the water meter 97 to determine and control the amount of foam liquid concentrate and water being filled into each of the two 200 gallon tanks 30. Accordingly, the solution of foam liquid concentrate and water in each of the tanks 30 is accurately measured and controlled to maintain the desired ratio of foam liquid concentrate to water in the solution. The foam solution is mixed in the non-pressurized 200 gallon tanks 30 to provide a uniform solution mixture throughout the entire filled volume of the tanks.

From the tanks 30, the solution is pumped and pressurized by at least one of two diaphragm pumps 24 for pressurized delivery of the solution through a foam cylinder ejector 25. The volume of the solution is adjusted by air pressure that is delivered from the air compressor holding tank 40 using controls on a foam control panel 22. The air compressor 60 replenishes a supply of pressurized air that is contained in the holding tank 40. The foam volume and density is adjusted by regulating the air injection and solution flow rate as the air and solution enter the foam cylinder ejector 25. In the ejector 25, the desired amount of air and solution are combined under pressure. The pressurized flow of air/solution mixture exiting the foam cylinder ejector 25 enters a foam carburetor 65 for generating a foam product. Specifically, the pressurized flow of air/solution mixture is mechanically impacted with beads 65D (see FIG. 4) within the foam carburetor 65 which creates the foam product. The PLC 35 regulates the amount of foam product per batch via a pneumatic ball valve 12.

Figure 3:
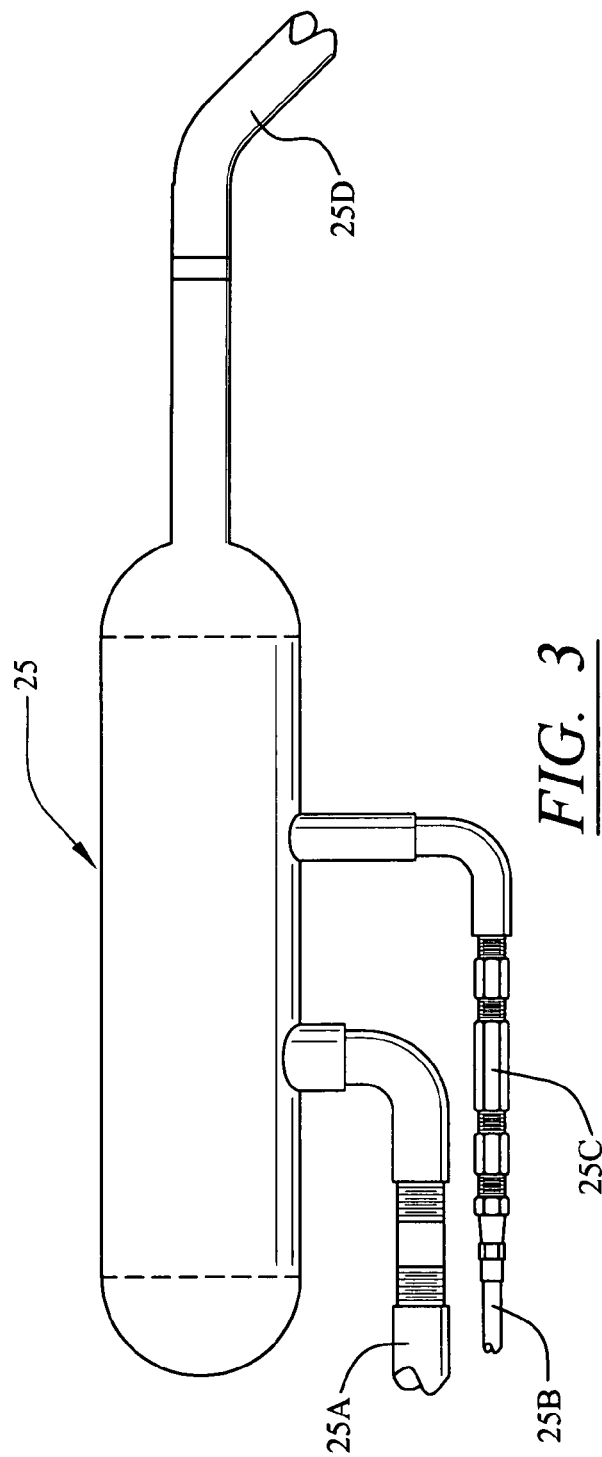
FIG. 3 is a side elevational view of a foam cylinder ejector of the apparatus.

Referring to FIG. 3, the foam cylinder ejector 25 includes a one inch solution inlet hose 25A and a one half inch air inlet hose 25B. The air inlet hose 25B is fitted with a high pressure hydraulic check valve 25C to prevent back flow through the inlet hose 25B. Accordingly, using the foam control panel 22, as shown in FIG. 2, the pressurized flow of air from the holding tank 40 is delivered into the foam cylinder ejector, through the inlet hose 25B, at an adjusted pressure and flow rate according to the desired volume and density of the foam product to be subsequently generated in the carburetor. Further, the flow rate of the solution is controlled at the foam control panel 22 for delivery through the inlet hose 25A and into the foam cylinder ejector 25 at the controlled rate to achieve the desired volume and foam density. The foam cylinder ejector 25 further includes a pressurized solution outlet hose 25D for directing the pressurized air/solution mixture to the foam generator 65. The pneumatic ball valve 12 is operated in order to control the rate of flow of the pressurized air/solution mixture into the foam carburetor 65.

Figure 4:
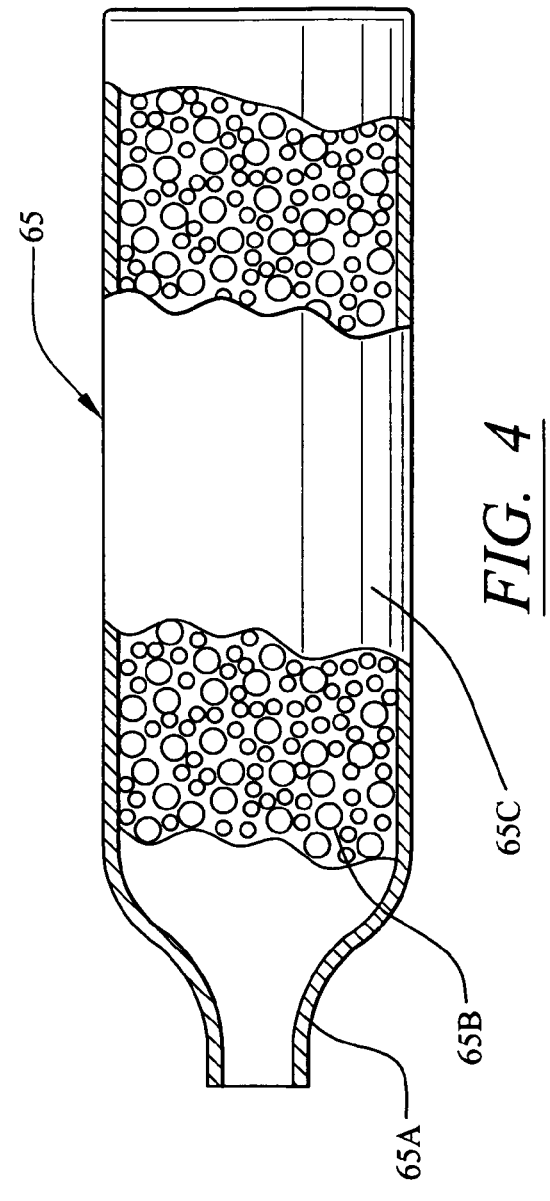
FIG. 4 is an isolated elevational view of a foam carburetor, shown in partial cross-section, used for generating the foam product in the apparatus of the present invention.

Referring to FIG. 4, the foam carburetor 65 is shown. The foam carburetor is open at both ends to permit flow of foam materials therethrough. A first end of the foam carburetor is fitted with a PVC reduction coupling 65A that communicates with the main body 65C of the foam carburetor. In a preferred embodiment, the main body 65C is formed of schedule 40, four inch PVC pipe. The reduction coupling 65A is approximately one inch in diameter. Accordingly, as the pressurized flow of air/foam solution mixture is directed into the carburetor, through the reduction coupling, the mixture expands at a 1:4 ratio as it is impacted against polyethylene beads 65B packed within the interior of the carburetor body 65C. Mesh screens are fitted within the carburetor body, near the opposite ends, to contain the beads 65B therein. The mechanical impact of the air/solution mixture with the beads 65B transforms the mixture into the foam product which exits at the larger (4 inch) end of the carburetor body 65C.

As noted above, the foam product is mixed with cement in the dual drum mixer 20 to create the desired lightweight concrete product. For each batch, the PLC 35 controls the predetermined amount of foam product and cement released into the dual drum mixer 20. Specifically, the pneumatic ball valve 12 is operated by the PLC 35 to control the amount and the rate of release of foam product from the foam carburetor 65 into the dual drum mixer 20. Similarly, the PLC 35 controls the amount of cement delivered from the hopper 14 into the dual drum mixer 20 for the controlled ratio of foam product to cement for each batch of lightweight concrete produced by the apparatus 10. The cement in the hopper 14 is measured by a hydraulic cylinder connected to a pressure sensor. The PLC 35 communicates with the pressure sensor and converts the PSI to pounds of weight. The PLC 35 then controls the discharge of cement from the hydraulic auger 11 into the dual drum mixer 20 according to the predetermined ratio of cement to foam product per batch.

While the instant invention has been generally shown and described in accordance with a preferred and practical embodiment thereof, it is recognized that departures from the instant disclosure are contemplated within the spirit and scope of the present invention.

What is claimed is:

1. An apparatus for manufacturing a lightweight concrete composition, comprising:
    at least one solution holding tank for holding a solution of foam concentrate and water;
    a flow meter for monitoring the rate of flow of the foam concentrate into the at least one solution holding tank;
    a water meter for measuring the rate of flow of water into the at least one solution holding tank;
    a programmable logic controller communicating with the flow meter and the water meter for determining and controlling the amount of foam concentrate and the amount of water entering into the at least one solution holding tank for achieving a desired ratio of mixture of the foam concentrate and water in the solution;
    at least one pump for pumping the solution from the at least one solution holding tank;

an air compressor for generating a pressurized supply of air and including an air holding tank for containing a charge of the pressurized air supply;

a foam control regulator for controlling air pressure and air flow rate of the pressurized supply of air released from the air holding tank, and said foam control regulator being further structured and disposed for controlling the flow rate of the pumped solution from said at least one pump, and thereby controlling the volume of air to be mixed with a controlled amount of the solution according to a desired ratio;

a foam cylinder ejector for receiving the controlled air pressure and air flow and the controlled flow rate of the solution from said foam controlled regulator, and said foam cylinder ejector being structured and disposed for mixing the pressurized supply of air flow and the flow of solution, under pressure, to produce an air/solution mixture according to the desired ratio;

a foam carburetor for receiving the pressurized flow of air/solution mixture, and said foam carburetor including a cylindrical housing at least partially filled with a plurality of beads and said foam carburetor being structured and disposed for generating a foam product by the mechanical impaction of the pressurized flow of air/solution mixture with the beads, and said foam carburetor being further structured and disposed for dispensing the generated foam product from the housing;

a pneumatic valve between said foam cylinder ejector and said foam carburetor for controlling the pressurized flow of the air/solution mixture to said foam carburetor, and said pneumatic valve communicating with said programmable logic controller, said programmable logic controller controlling operation of said pneumatic valve for delivering a predetermined amount of the pressurized flow of the air/solution mixture to said foam carburetor according to a predetermined amount of foam product to be generated;

a hopper for holding a charge of cement;

a hydraulic auger operated by a motor for transferring the charge of cement from said hopper;

a dual drum mixer having an open top for receiving the transferred charge of cement from the hydraulic auger, and said dual drum mixer being further structured and disposed for receiving the predetermined amount of foam product produced generated by said foam carburetor, and said dual drum mixer being structured and disposed for mixing the foam product and the cement to produce the lightweight concrete composition; and said programmable logic controller being further adapted for determining the weight of the cement being transferred and for controlling operation of said hydraulic auger to thereby control an amount of the cement transferred into said dual drum mixer for mixing with the foam product.

2. The apparatus as recited in claim 1 further comprising:

a chassis frame structure having a plurality of axles and wheels for supporting the apparatus and transporting the apparatus behind a towing vehicle.

* * * * *